(12) United States Patent
Iyewarun

(10) Patent No.: US 8,191,881 B1
(45) Date of Patent: Jun. 5, 2012

(54) PORTABLE CUTTING TABLE AND ASSOCIATED METHOD

(76) Inventor: Abayomi Iyewarun, Jacksonville, FL (US)

( * ) Notice: Subject to any disclaimer, the term of this patent is extended or adjusted under 35 U.S.C. 154(b) by 580 days.

(21) Appl. No.: 12/381,826

(22) Filed: Mar. 17, 2009

Related U.S. Application Data

(60) Provisional application No. 61/069,616, filed on Mar. 17, 2008.

(51) Int. Cl.
*B23Q 3/00* (2006.01)
*A47B 37/00* (2006.01)
*A47J 17/00* (2006.01)

(52) U.S. Cl. .................... 269/289 R; 99/537; 108/50.11; 108/127

(58) Field of Classification Search ............... 269/289 R, 269/15; 108/24, 50.11, 127, 129–133, 108, 108/28; 99/537
See application file for complete search history.

(56) References Cited

U.S. PATENT DOCUMENTS

| | | | |
|---|---|---|---|
| 3,897,738 A * | 8/1975 | Minsky et al. | 108/119 |
| 4,765,603 A | 8/1988 | Huppert | |
| 5,311,813 A | 5/1994 | Fairbanks | |
| 5,546,852 A | 8/1996 | Bidwell | |
| 5,860,367 A | 1/1999 | Riegel | |
| 6,206,445 B1 | 3/2001 | Brooks | |
| 6,722,644 B1 * | 4/2004 | Prosser | 269/289 R |
| 7,128,001 B2 | 10/2006 | Tsai | |
| 7,284,549 B1 * | 10/2007 | Eby et al. | 126/9 R |
| D569,694 S * | 5/2008 | Bizzell | D7/698 |
| 7,849,789 B1 * | 12/2010 | Whelan | 108/130 |

* cited by examiner

Primary Examiner — Hadi Shakeri

(57) ABSTRACT

A portable cutting table may include a free-standing and collapsible frame adapted to be transported between remote locations. A cutting surface is preferably connected to a topmost region of the frame in such a manner that the cutting surface preferably remains centrally conjoined to the frame while the frame preferably is biased between folded and unfolded positions. A frame biasing mechanism articulates the frame between the folded and unfolded positions while the cutting surface remains statically engaged with the topmost surface. A plurality of knife-holding implements may be directly and fixedly mated to the frame biasing mechanism. Such knife-holding implements may be simultaneously articulated about a fulcrum axis registered orthogonal to a longitudinal axis of the cutting surface such that the knife-holding implements are automatically displaced between stored and exposed positions as the frame is biased between the folded and unfolded positions respectively.

10 Claims, 4 Drawing Sheets

PORTABLE CUTTING TABLE AND ASSOCIATED METHOD

CROSS REFERENCE TO RELATED APPLICATIONS

This application claims the benefit of U.S. Provisional Application No. 61/069,616, filed Mar. 17, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to cutting tables and, more particularly, to a portable cutting table including a support frame for holding a plurality of knife hooks and pivotal leg members for assisting in food preparation in a variety of locations.

2. Prior Art

Cutting tables have been in use for nearly as long as man has been civilized. The utility of a cutting table is derived from a need to cut various objects while simultaneously preserving the cutting edge of knives or blades. In the specific case of the culinary arts, the chef will also aspire to prepare foods in a clean and sanitary way.

Directly cutting objects upon a hard support which resists damage from a knife is known to unduly dull the knife when the object is severed. Dulled cutlery requires additional force when severing work, and may lead to dangerous slipping and injury. Yet maintaining the cutlery in a sharp state requires substantial sharpening time, and, when the cutlery is repeatedly dulled by the work support, the repeated sharpening also leads to undesired wear of the cutlery. However, cutting without suitable work surfaces will likely result in unrestrained movement of the cutting blade. This practice may lead to injury. Furthermore, without a suitable support, foods may be contaminated by unsterile surfaces. A similar issue arises with the use of a porous work support surface. The porous surface will trap food juices therein, potentially contaminating the work surface and harboring dangerous pathogens.

In a modern household, the cutting table will allow a person to prepare food quickly by slicing a diverse variety of foods, spices and other food ingredients without fear of permanently damaging either the work areas, typically counters and the like, or damaging the cutlery. With an appropriate cutting table, the cook may simply press hard enough to ensure that the food is completely sliced, without regard for what might occur with the knife after the food has been severed.

Outside of the kitchen, but still within a dwelling, there are many times when a person requires the use of a sharp blade such as a razor blade, Exacto-Knife or other tool for cutting various substrates. In these instances, the same concerns regarding the cutlery and work surfaces exist, where the working knife must, to perform the intended function, pierce through the material being cut. As a consequence, it is impossible for a person to stop short of cutting all the way through the substrate and still obtain the desired result. Consequently, there must be contact between the knife and the underlying work support. Where this work support is furniture or the like, the knife will cause harm and damage that may be irreparable.

In the outdoors or in areas less furnished, there may not be a ready work surface. In such instances, it is highly desired to provide a way to prepare food without risking contamination of the food with dirt, earth or the like. Similarly, the knife will also most desirably be protected from damage.

In the prior art, in order to achieve the important goals of protecting the knife while providing a severing surface, and to simultaneously avoid harboring dangerous pathogens, many cutting tables have been fabricated from wood. In particular, closed grain or minimally-grained woods tend to be preferred, such as maple, in the fabrication of cutting tables. This is because most wood species have very little damaging effect on the sharpness of a knife edge during engagement therewith, and closed-grain species provide a relatively non-porous and safe surface for working upon.

To prevent liquids from penetrating the wood and forming a hazardous surface, a food oil such as vegetable oil is commonly applied to the wood and permitted to soak into the pores or openings therein. As is known, the oil prevents water-based liquids from penetrating therein, while simultaneously providing a relatively mild, oiled surface against which the knife blade will be pressed. This oiled wood surface provides very minimal wearing of the knife blade or wooden surface, and yet may be readily cleaned or washed after use.

These traditional wooden cutting surfaces have been the standard used in kitchens for many years. However, the wooden surface requires proper cleaning and oiling to ensure safe usage over time. To have utility with different projects and types of work, the cutting table must be reasonably large to adequately support the various work. In a large kitchen area, this normally does not present a problem, since there is usually a space where the cutting table may either be supported on edge or otherwise stored. In fact, many modern kitchens include a pull-out cutting table immediately below the counter-top.

However, it will be apparent that the surface area of the cutting table and, relative to surface area, thinness of the table, does not lend the table to be readily transported, nor for storage in smaller spaces or places. Not only does the traditional thin and flat cutting table suffer from an inconvenient size, the table must either be manufactured excessively thick to have adequate strength to avoid breakage, or may instead be excessively heavy. Yet, there are many times where a person would benefit from the availability of the cutting table, for outdoor hunting activities or other activities outside of the user home.

Accordingly, the present invention is disclosed in order to overcome the above noted shortcomings. The portable cutting table is convenient and easy to use, portable yet durable in design, and designed for assisting in food preparation in a variety of locations. The apparatus is simple to use, inexpensive, and designed for many years of repeated use.

BRIEF SUMMARY OF THE INVENTION

In view of the foregoing background, it is therefore an object of the present invention to provide a portable cutting table for supporting foodstuff during cutting operations. These and other objects, features, and advantages of the invention are provided by the portable cutting table and associated method.

In a preferred embodiment of the present invention, a portable cutting table may include a free-standing and collapsible frame adapted to be transported between remote locations. A cutting surface is preferably connected to a top-most region of the frame in such a manner that the cutting surface preferably remains centrally conjoined to the frame while the frame is biased between folded and unfolded positions.

The present invention further includes a mechanism that selectively biases the frame between the folded and unfolded positions while the cutting surface remains statically engaged with the top-most surface. A plurality of knife-holding implements may be directly and fixedly mated to the frame biasing mechanism. Such knife-holding implements may be simultaneously articulated about a fulcrum axis registered orthogonal to a longitudinal axis of the cutting surface such that the knife-holding implements are automatically displaced between stored and exposed positions as the frame is biased between the folded and unfolded positions respectively.

In one embodiment, the cutting surface may include a planar top-most surface registered along a horizontal plane. Such a cutting surface may also include a plurality of beveled edges obliquely offset from the horizontal plane. As an example, the beveled edges may be monolithically formed with an outer perimeter of the cutting surface. Notably, the beveled edges slope downwardly and away from the outer perimeter and terminate at in inner perimeter of the top-most region of the frame for effectively directing fluid and debris away from the top-most surface during cutting operations.

The frame may also include a plurality of rectilinear support legs cooperating with the cutting surface. Each top end of the support legs are preferably situated subjacent to a horizontally oriented bottom wall of the cutting surface. Such top ends are preferably juxtaposed at a corresponding corner of the cutting surface for adequately supporting the cutting surface at the unfolded position.

In one embodiment, the frame biasing mechanism may include a plurality of rectilinear anchor rails statically and fixedly connected to the bottom wall of the cutting surface respectively. The frame biasing mechanism further includes a plurality of primary fastening members laterally traversing through the anchor rails and may be coupled to the corresponding one of the top ends of the support legs. A first pair of such support legs may be simultaneously and synchronously pivoted about a first axis longitudinally passing through a first one of the anchor rails. A second pair of the support legs may be simultaneously and synchronously pivotal about a second axis longitudinally passing through a second one of the anchor rail. Notably, each of the first and second axes are preferably oriented parallel to the fulcrum axis.

The frame biasing mechanism may further include a plurality of auxiliary support arms each preferably having axially opposed ends directly connected to a corresponding support leg and corresponding anchor rail, respectively. A plurality of secondary fastening members are directly anchored to the bottom wall and extend downwardly therefrom along a path registered orthogonal thereto. Each of such secondary fastening members may be removably coupled to a corresponding one of the auxiliary support arms when the frame is biased to the folded position such that the support legs are prohibited from prematurely pivoting to the unfolded position.

The frame biasing mechanism further includes a first pair of anchor rails preferably registered parallel to oppositely situated longitudinal edges of the cutting surface, and a second pair of the anchor rails preferably registered parallel to oppositely situated latitudinal edges of the cutting surface. Axially opposed ends of the second pair of anchor rails are rotatably connected to corresponding axially opposed ends of the first pair of anchor rails such that the second pair of anchor rails respectively rotate along the first and second axes as the frame is rotated between the folded and unfolded positions.

In this manner, the first pair of anchor rails may remain statically coupled to the frame while the second pair of anchor rails rotate in sync with the support legs and the auxiliary support arms respectively. The first pair of anchor rails and the support legs may be contiguously oriented parallel to the longitudinal edges of the cutting surface when the frame is adapted to the folded position.

The present invention further includes a method of employing a portable cutting table for supporting foodstuff during cutting operations. Such a method may include the chronological steps of: providing a free-standing and collapsible frame preferably adapted to be transported between remote locations; and providing and connecting a cutting surface to a top-most region of the frame.

The method may further include the chronological steps of: providing and attaching a frame biasing mechanism to the frame; providing and fixedly mating a plurality of knife-holding implements directly to the frame biasing mechanism; and selectively biasing the frame between folded and unfolded positions while maintaining the cutting surface statically engaged with the top-most region.

The method may further include the chronological step of: simultaneously articulating the knife-holding implements about a fulcrum axis registered orthogonal to a longitudinal axis of the cutting surface such that the knife-holding implements are automatically displaced between stored and exposed positions as the frame is biased between the folded and unfolded positions respectively. During such articulation, the cutting surface remains centrally conjoined to the frame while the frame is biased between the folded and unfolded positions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
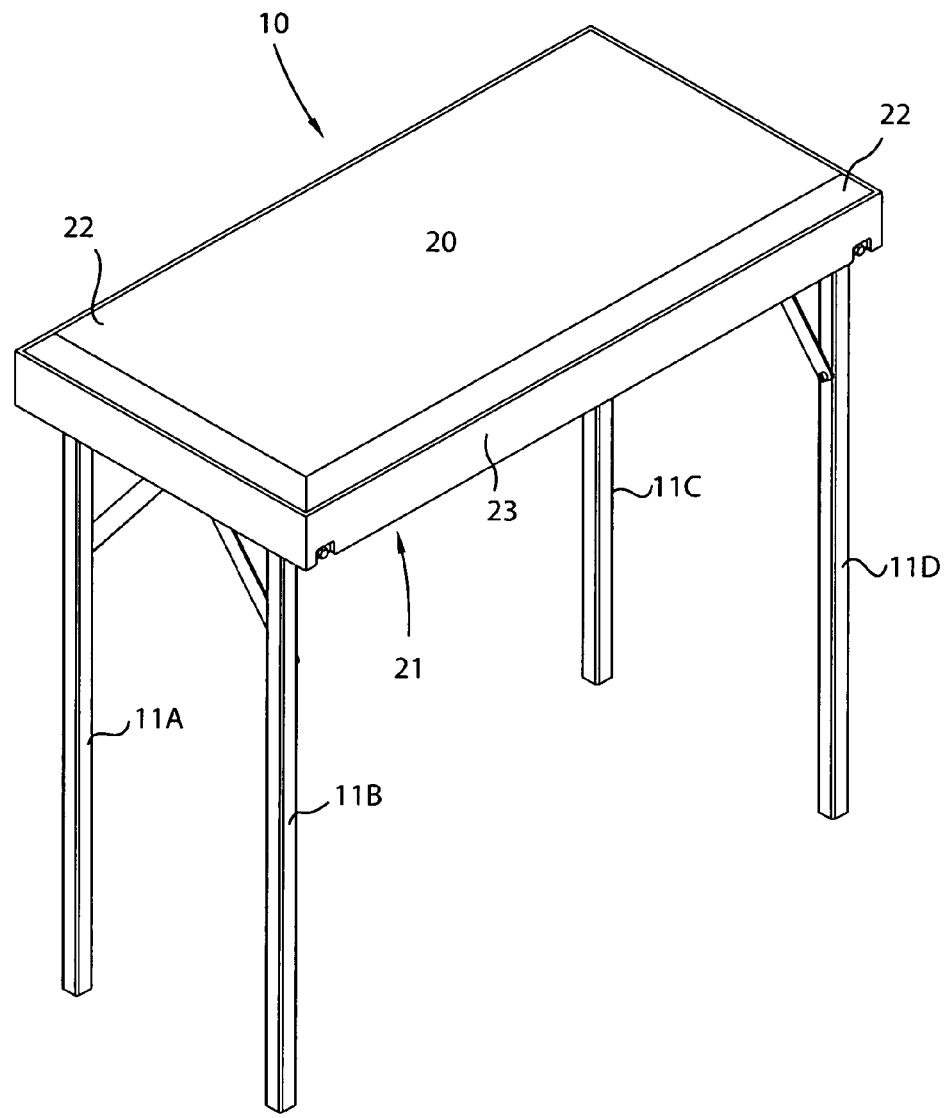
FIG. 1 is a perspective view showing a portable cutting table, in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The present invention 10 is referred to generally in FIGS. 1-7 and is intended to provide a portable cutting table and associated carrying case 24. It should be understood that the cutting table may be used to accommodate many different types of cutting surfaces 20 such as wood, granite, stainless steal, or other suitable material well known by one skilled in the art, and should not be limited to any particular cutting surface 20. These and other objects, features, and advantages of the invention 10 are provided by the portable cutting table and associated method.

Referring initially to FIGS. 1-7, the portable cutting table 10 includes a sanitary cutting surface 20 for food preparation, which is adapted to removably attach to a collapsible frame 21. The cutting surface 20 has sanitary qualities for assisting the user in safe, efficient food preparation procedures. This present invention 10 may be advantageous for hunters or fishers, providing a sanitary and stable surface for skinning and cleaning animals on site.

In a preferred embodiment of the present invention 10, the portable cutting table may include a free-standing and collapsible frame 21 adapted to be transported between remote locations. The cutting surface 20 is preferably connected to a top-most region 23 of the frame 21 in such a manner that the cutting surface 20 preferably remains centrally conjoined to the frame 21 while the frame 21 is biased between folded and unfolded positions. Such a feature ensures the cutting surface 20 does not prematurely disengage the frame 21 while being quickly biased between the folded and unfolded positions as well as transported between remote locations.

Figure 4:
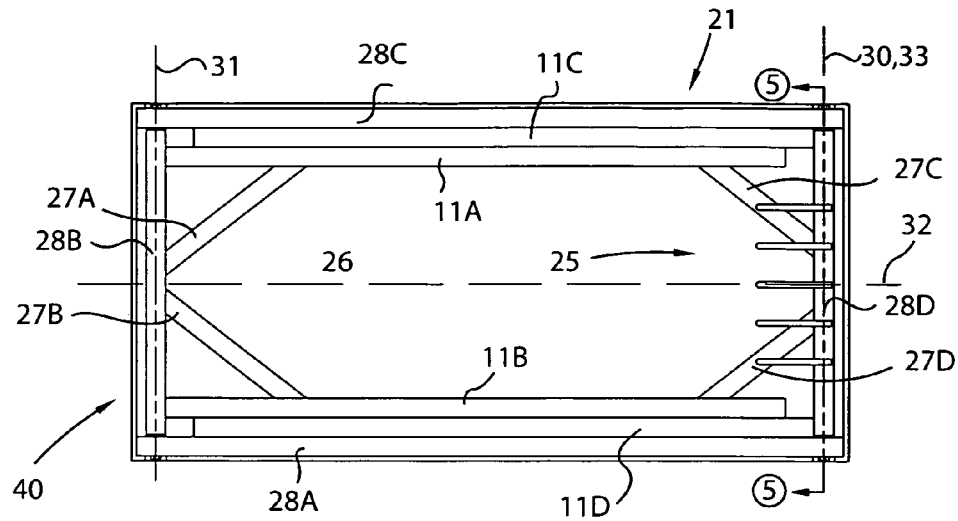
FIG. 4 is a bottom plan view showing the portable cutting table at a folded position.
Figure 5:
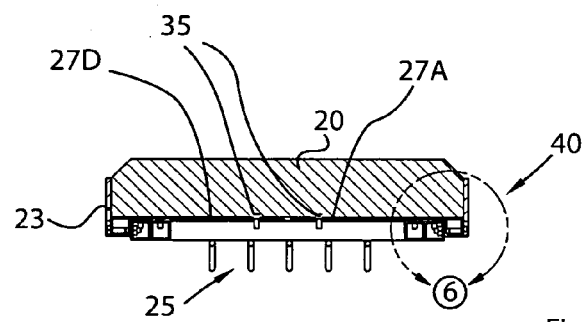
FIG. 5 is a cross-sectional view of the frame biasing mechanism taken along line 5-5, as shown in FIG. 4.
Figure 6:
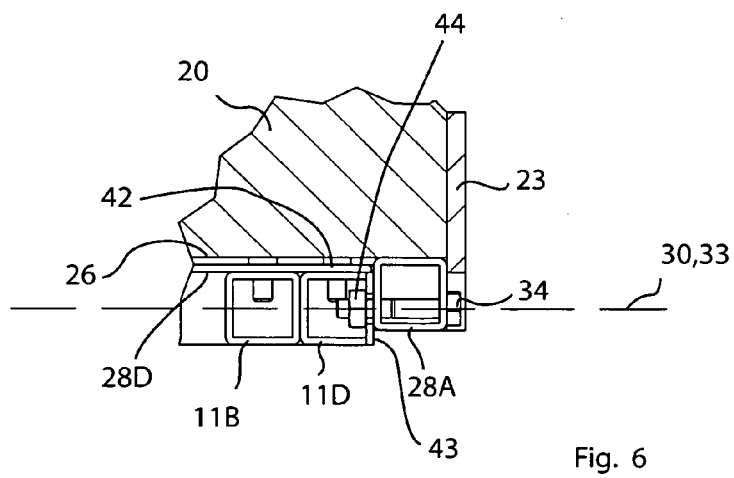
FIG. 6 is an enlarged view of the frame biasing mechanism, as shown in FIG. 5.

As perhaps best shown in FIGS. 4-6, the present invention 10 further includes a mechanism 40 that selectively biases the frame 21 between the folded and unfolded positions while the cutting surface 20 remains statically engaged with the top-most region 23 of the frame 21. A plurality of knife-holding implements 25 may be directly and fixedly mated to the frame biasing mechanism 40. Such knife-holding implements 25 may include hooks or suitable fasteners for permitting the user to quickly and efficiently access the knives/cutting utensils during operating conditions.

Figure 2:
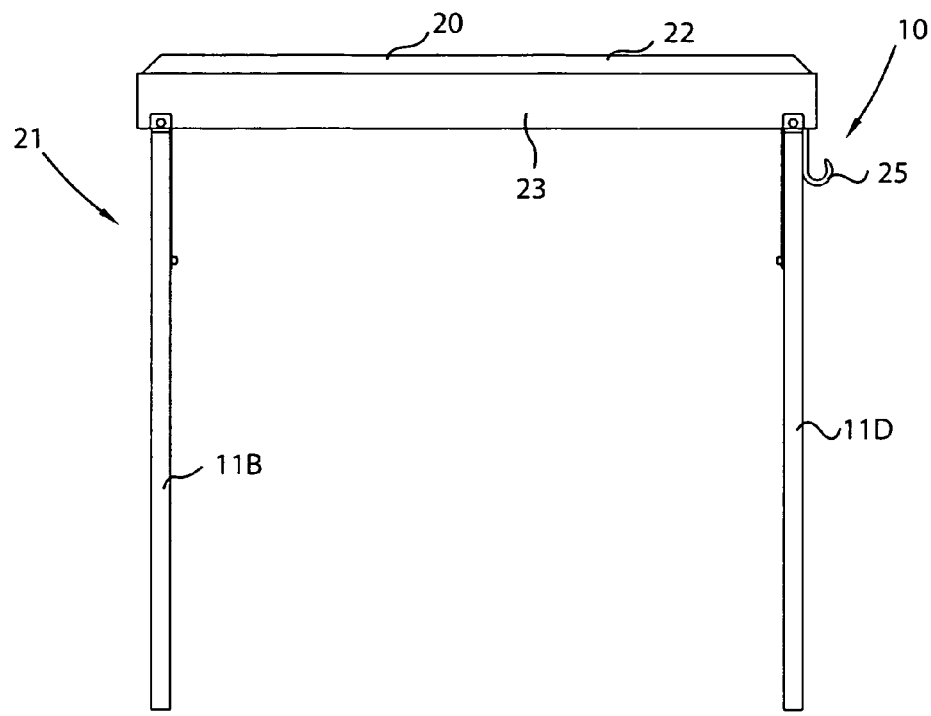
FIG. 2 is a side elevational view of the portable cutting table, as shown in FIG. 1.
Figure 3:
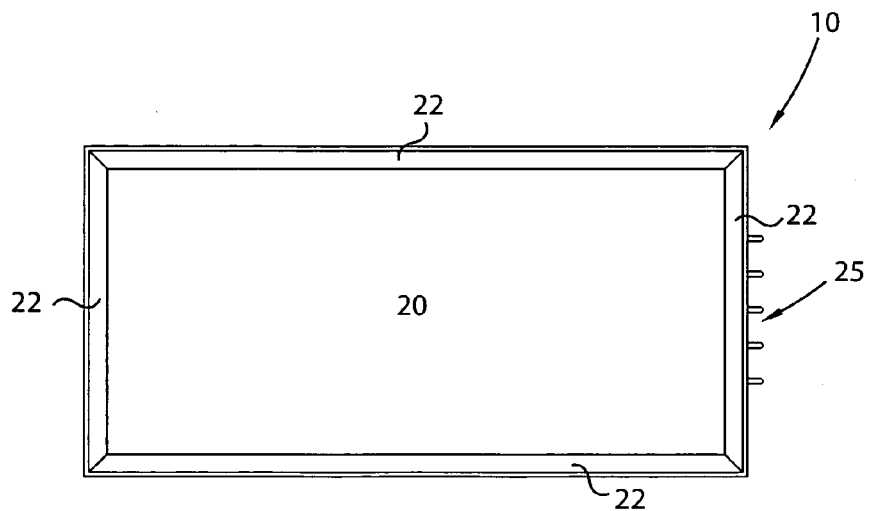
FIG. 3 is a top plan view of the portable cutting table, as shown in FIG. 1.

Advantageously, as perhaps best shown in FIGS. 2 and 3, the knife-holding implements 25 may be simultaneously articulated about a fulcrum axis 33 registered orthogonal to a longitudinal axis 32 of the cutting surface 20 such that the knife-holding implements 25 are automatically displaced between stored and exposed positions as the frame 21 is biased between the folded and unfolded positions respectively. Such a feature provides the unexpected and unpredictable benefit of enabling a user to swiftly collapse and set up the cutting table 10 while ensuring the knife-holding implements 25 will be properly oriented adjacent to one end of the cutting surface 20.

In one embodiment, as perhaps best shown in FIGS. 1-3, the cutting surface 20 may include a planar top-most surface registered along a horizontal plane. Such a cutting surface 20 may also include a plurality of beveled edges 22 obliquely offset from the horizontal plane. As an example, the beveled edges 22 may be monolithically formed with an outer perimeter of the cutting surface 20. Notably, the beveled edges 22 slope downwardly and away from the outer perimeter and terminate at an inner perimeter of the top-most edge of region 23 of the frame 21 for effectively directing fluid and debris away from the top-most surface during cutting operations. Such a feature is beneficial for assisting the user to displace undesirable food scraps and fluid byproduct away from the cutting surface 20 so that the foodstuff is not contaminated by scraps and fluid byproducts.

Referring back to FIGS. 4-6, the frame 21 may also include a plurality of rectilinear support legs 11A-11D cooperating with the cutting surface 20. Each top end of the support legs 11A-11D are preferably situated subjacent to a horizontally oriented bottom wall 26 of the cutting surface 20. Such top ends are preferably juxtaposed at a corresponding corner of the cutting surface 20 for adequately supporting the cutting surface 20 at the unfolded position. By maintaining the support legs 11A-11D spaced beneath the cutting surface 20, the likelihood of undesirably shaking or tilting the cutting surface 20 is reduced.

In one embodiment, the frame biasing mechanism 40 may include a plurality of rectilinear anchor rails 28A-28D statically and fixedly connected to the bottom wall 26 of the cutting surface 20 respectively. The frame biasing mechanism 10 further includes a plurality of primary fastening members 34 laterally traversing through the anchor rails 28A-28D and coupled to corresponding ones of the top ends of the support legs 11A-11D. The anchor rails 28A-28D provide the unexpected and unpredictable advantage of absorbing impact and operating forces during cutting and folding procedures so that the support legs 11A-11D remain at substantially stable positions after repeated use.

Still referring to FIGS. 4-6, a first pair of such support legs 11C-11D may be simultaneously and synchronously pivoted about a first axis 30 longitudinally passing through a first one of the anchor rails 28D. A second pair of the support legs 11A-11B may be simultaneously and synchronously pivotal about a second axis 31 longitudinally passing through a second one of the anchor rails 28B. Notably, each of the first and second axes 30, 31 are preferably oriented parallel to the fulcrum axis 33. In this manner, the user is able to quickly articulate the support legs 11A-11D by simply pivoting the first and second pairs without having to independently pivot each support leg 11A-11D one at a time. Such a structural relationship between the anchor rails 28A-28D and the leg support pairs also ensures the cutting surface 20 remains level and plum after repeated use.

Still referring to FIGS. 4-6, the frame biasing mechanism 40 may further include a plurality of auxiliary support arms 27A-27D each preferably having axially opposed ends directly connected to a corresponding support leg 11A-11D and corresponding anchor rail 28A-28D, respectively. A plurality of secondary fastening members 35 are directly anchored to the bottom wall 26 and extend downwardly along a path registered orthogonal thereto. Each of such secondary fastening members 35 may be removably coupled to a corresponding one of the auxiliary support arms 27A-27D when the frame 21 is biased to the folded position such that the support legs 11A-11D are prohibited from prematurely pivoting to the unfolded position. In this manner, the operator is able to rapidly bias the support legs 11A-11D to the folded position without having to double-check the position of such support legs 11A-11D to ensure a proper and secure fit against the bottom wall 26 of the cutting surface 20.

As can be seen in FIG. 4, the first pair of anchor rails 28B, 28C is preferably registered parallel to oppositely situated longitudinal edges of the cutting surface 20, and a second pair of the anchor rails 28A, 28D preferably registered parallel to oppositely situated latitudinal edges of the cutting surface 20. Anchor rails 28A, 28D are hollow and tubular for allowing properly rotational movement about the fulcrum axis 33 without engaging the bottom wall 26.

Referring to FIGS. 4-6, axially opposed ends of the second pair of anchor rails 28A, 28D are rotatably connected to corresponding axially opposed ends of the first pair of anchor rails 28B, 28C such that the second pair of anchor rails 28A, 28D respectively rotate along the first and second axes 30, 31 as the frame 21 is rotated between the folded and unfolded positions. Snap-type fasteners 42 may be connected to bottom wall 26 and frictionally engage anchor rails 28A, 28D when legs 11A-11D are biased to the folded position, as perhaps best shown in FIG. 6.

As an example, one pivoting connection of frame biasing mechanism 40 includes a bearing member 43 rotatably intercalated between the nut 44 of fastening member 34 and a lateral face of anchor rail 28A. Such a bearing member 42 is statically coupled to anchor rail 28D and rotates in sync therewith. Nut 44 is calibrated to a desired tension with bearing member 43 such that anchor rail 28D is permitted to rotate about the fulcrum axis 33 while maintaining minimal tension to prevent undesirable articulation between the folded and unfolded positions. Such tension may be adjusted and calibrated, as needed by the user, by tightening or loosening nut 43 against bearing member 42.

By pivotally mating the second pair of anchor rails 28A, 28D to the first pair of anchor rails 28B, 28C, the unpredicted and unexpected result of uniform articulation of the support legs 11A-11D is obtained. Further, such a structural arrangement distributes operating and stress forces along the longitudinal lengths of the second anchor rails 28A, 28D rather than focusing such forces at the connection points between the top ends of support legs 11A-11D and the second anchor rails 28A, 28D, respectively.

In this manner, the first pair of anchor rails 28B, 28C may remain statically coupled to the frame 21 while the second pair of anchor rails 28A, 28D rotate in sync with the support legs 11A-11D and the auxiliary support arms 27A-27D, respectively. The first pair of anchor rails 28B, 28C and the support legs 11B-11C may be contiguously oriented parallel to the longitudinal edges of the cutting surface 20 when the frame 21 is adapted to the folded position. As noted hereinabove, such a structural arrangement provides the advantageous benefit of uniformly distributing the weight and operating stresses of the support legs 11A-11D between folded and unfolded positions while simultaneously exposing the knife-holding implements 25 at a desired location adjacent to an end of the cutting surface 20 after repeated use.

The present invention 10 further includes a method of employing a portable cutting table for supporting foodstuff during cutting operations. Such a method may include the chronological steps of: providing a free-standing and collapsible frame 21 preferably adapted to be transported between remote locations; and providing and connecting a cutting surface 20 to a top-most region 23 of the frame 21.

The method may further include the chronological steps of: providing and attaching a frame biasing mechanism 40 to the frame 21; providing and fixedly mating a plurality of knife-holding implements 25 directly to the frame biasing mechanism 40; and selectively biasing the frame 21 between folded and unfolded positions while maintaining the cutting surface 20 statically engaged with the top-most region 23.

The method may further include the chronological step of: simultaneously articulating the knife-holding implements 25 about a fulcrum axis 33 registered orthogonal to a longitudinal axis 32 of the cutting surface 20 such that the knife-holding implements 25 are automatically displaced between stored and exposed positions as the frame 21 is biased between the folded and unfolded positions respectively. During such articulation, the cutting surface 20 remains centrally conjoined to the frame 21 while the frame 21 is biased between the folded and unfolded positions.

Figure 7:
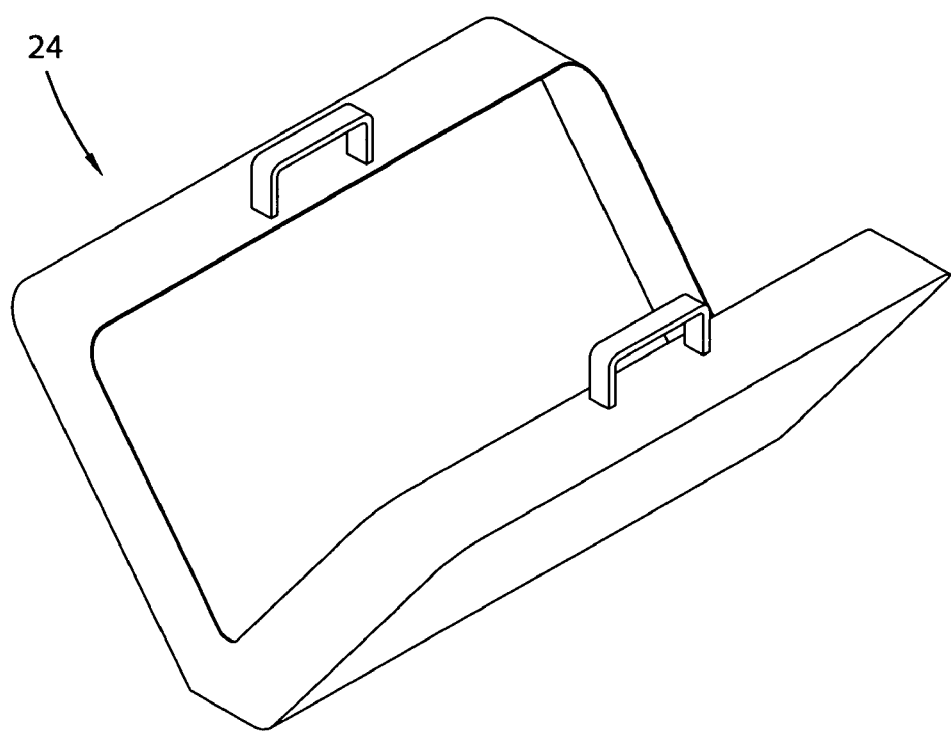
FIG. 7 is a perspective view showing a carrying case for transporting portable cutting table in a folded position.

Further, referring to FIG. 7, the present invention 10 may further include a carrying case 24 preferably formed from a water-resistant material to enable a user to easily transfer the cutting table 10 between remote locations. The carrying case 24 may further be padded to protect the portable cutting table 10 from inadvertent damage during repeated use.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A portable cutting table for supporting foodstuff during cutting operations, said portable cutting table comprising:
   a collapsible frame adapted to be transported between remote locations;
   a cutting surface connected to a top-most region of said frame, said cutting surface remaining centrally conjoined to said frame while said frame is biased between folded and unfolded positions;
   means for selectively biasing said frame between the folded and unfolded positions while said cutting surface remains statically engaged with said top-most surface; and
   a plurality of knife-holding implements fixedly mated to said frame biasing means, said knife-holding implements being articulated about a fulcrum axis registered orthogonal to a longitudinal axis of said cutting surface such that said knife-holding implements are displaced between stored and exposed positions as said frame is biased between the folded and unfolded positions respectively;
   wherein said cutting surface comprises
   a planar top-most surface registered along a horizontal plane; and a plurality of beveled edges obliquely offset from the horizontal plane and monolithically formed with an outer perimeter of said cutting surface, said beveled edges sloping downwardly and away from said outer perimeter and terminating at an inner perimeter of said top-most region of said frame for effectively directing fluid and debris away from said top-most surface during cutting operations;

wherein said frame comprises: a plurality of rectilinear support legs each having top ends situated subjacent to a horizontally oriented bottom wall of said cutting surface, each of said top ends being juxtaposed at a corresponding corner of said cutting surface;

wherein said frame biasing means comprises a plurality of rectilinear anchor rails statically and fixedly connected to said bottom wall of said cutting surface respectively;

a plurality of primary fastening members laterally traversing through said anchor rails and being coupled to a corresponding one of said top ends of said support legs;

wherein a first pair of said support legs are simultaneously and synchronously pivoted about a first axis longitudinally passing through a first one of said anchor rails;

wherein a second pair of said support legs are simultaneously and synchronously pivotal about a second axis longitudinally passing through a second one of said anchor rails;

wherein each of said first and second axes are oriented parallel to said fulcrum axis.

2. The portable cutting table of claim 1, wherein said frame biasing means further comprises:

a plurality of auxiliary support arms each having axially opposed ends directly connected to a corresponding one of said support legs and a corresponding one of said anchor rails respectively; and a plurality of secondary fastening members directly anchored to said bottom wall and extending downwardly therefrom along a path registered orthogonal thereto, each of said secondary fastening members being removably coupled to a corresponding one of said auxiliary support arms when said frame is biased to the folded position such that said support legs are prohibited from prematurely pivoting to the unfolded position.

3. The portable cutting table of claim 2, wherein a first pair of said anchor rails are registered parallel to oppositely situated longitudinal edges of said cutting surface, a second pair of said anchor rails being registered parallel to oppositely situated latitudinal edges of said cutting surface;

wherein axially opposed ends of said second pair of anchor rails are rotatably connected to corresponding axially opposed ends of said first pair of anchor rails such that said second pair of anchor rails respectively rotate along said first and second axes as said frame is rotated between the folded and unfolded positions.

4. The portable cutting table of claim 3, wherein said first pair of anchor rails remain statically coupled to said frame while said second pair of anchor rails rotate in sync with said support legs and said auxiliary support arms respectively.

5. The portable cutting table of claim 4, wherein said first pair of anchor rails and said support legs are contiguously oriented parallel to said longitudinal edges of said cutting surface when said frame is adapted to the folded position.

6. A portable cutting table for supporting foodstuff during cutting operations, said portable cutting table comprising:

a free-standing and collapsible frame adapted to be transported between remote locations;

a cutting surface connected to a top-most region of said frame, said cutting surface remaining centrally conjoined to said frame while said frame is biased between folded and unfolded positions;

means for selectively biasing said frame between the folded and unfolded positions while said cutting surface remains statically engaged with said top-most surface; and a plurality of knife-holding implements directly and fixedly mated to said frame biasing means, said knife-holding implements being simultaneously articulated about a fulcrum axis registered orthogonal to a longitudinal axis of said cutting surface such that said knife-holding implements are automatically displaced between stored and exposed positions as said frame is biased between the folded and unfolded positions respectively;

wherein said cutting surface comprises:

a planar top-most surface registered along a horizontal plane; and a plurality of beveled edges obliquely offset from the horizontal plane and monolithically formed with an outer perimeter of said cutting surface, said beveled edges sloping downwardly and away from said outer perimeter and terminating at in inner perimeter of said top-most region of said frame for effectively directing fluid and debris away from said top-most surface during cutting operations;

wherein said frame comprises: a plurality of rectilinear support legs each having top ends situated subjacent to a horizontally oriented bottom wall of said cutting surface, each of said top ends being juxtaposed at a corresponding corner of said cutting surface;

wherein said frame biasing means comprises a plurality of rectilinear anchor rails statically and fixedly connected to said bottom wall of said cutting surface respectively;

a plurality of primary fastening members laterally traversing through said anchor rails and being coupled to a corresponding one of said top ends of said support legs;

wherein a first pair of said support legs are simultaneously and synchronously pivoted about a first axis longitudinally passing through a first one of said anchor rails;

wherein a second pair of said support legs are simultaneously and synchronously pivotal about a second axis longitudinally passing through a second one of said anchor rails;

wherein each of said first and second axes are oriented parallel to said fulcrum axis.

7. The portable cutting table of claim 6, wherein said frame biasing means further comprises:

a plurality of auxiliary support arms each having axially opposed ends directly connected to a corresponding one of said support legs and a corresponding one of said anchor rails respectively; and a plurality of secondary fastening members directly anchored to said bottom wall and extending downwardly therefrom along a path registered orthogonal thereto, each of said secondary fastening members being removably coupled to a corresponding one of said auxiliary support arms when said frame is biased to the folded position such that said support legs are prohibited from prematurely pivoting to the unfolded position.

8. The portable cutting table of claim 7, wherein a first pair of said anchor rails are registered parallel to oppositely situated longitudinal edges of said cutting surface, a second pair of said anchor rails being registered parallel to oppositely situated latitudinal edges of said cutting surface;

wherein axially opposed ends of said second pair of anchor rails are rotatably connected to corresponding axially opposed ends of said first pair of anchor rails such that said second pair of anchor rails respectively rotate along said first and second axes as said frame is rotated between the folded and unfolded positions.

9. The portable cutting table of claim 8, wherein said first pair of anchor rails remain statically coupled to said frame while said second pair of anchor rails rotate in sync with said support legs and said auxiliary support arms respectively.

10. The portable cutting table of claim 9, wherein said first pair of anchor rails and said support legs are contiguously oriented parallel to said longitudinal edges of said cutting surface when said frame is adapted to the folded position.

\* \* \* \* \*